Patented Aug. 7, 1928.

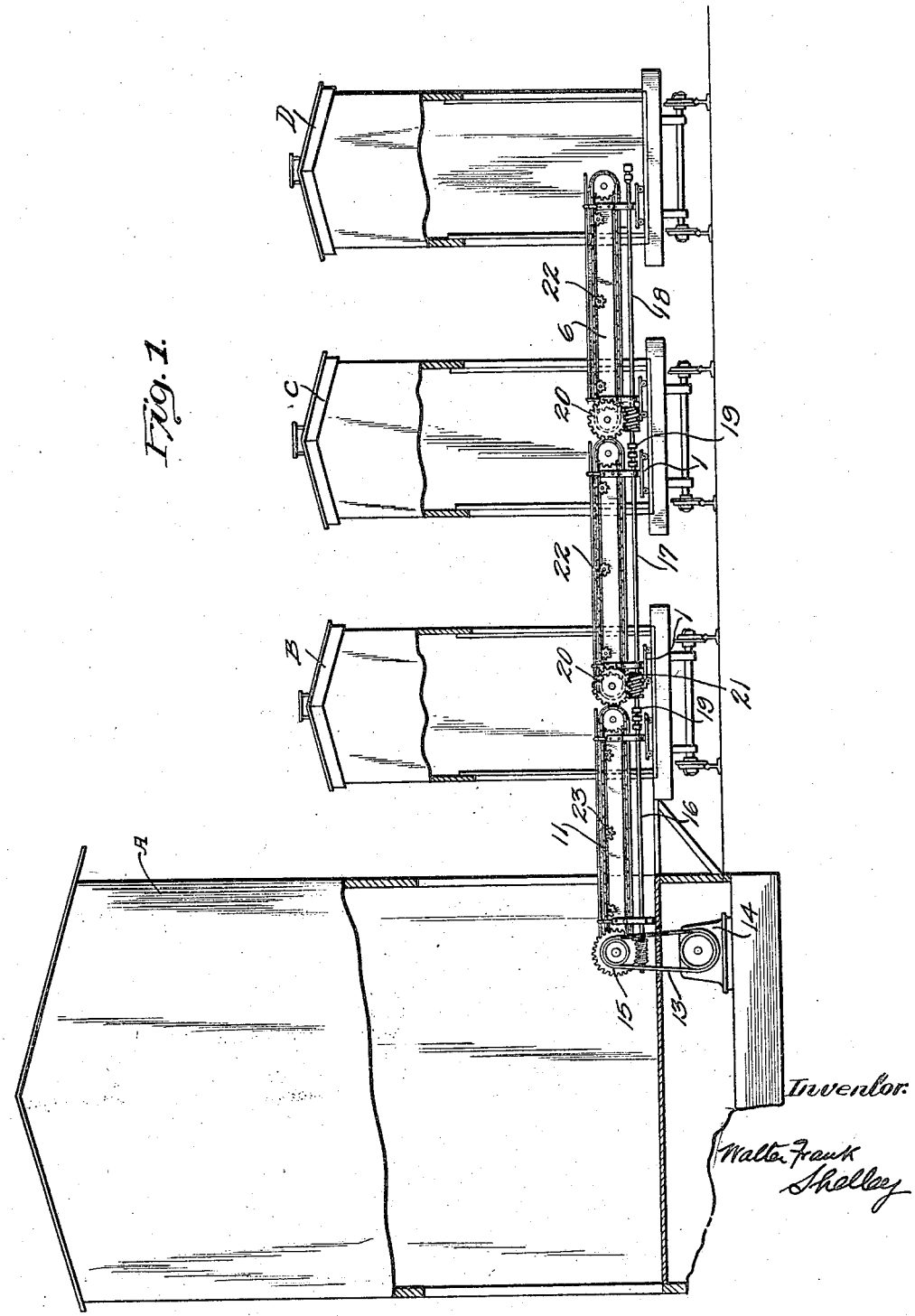

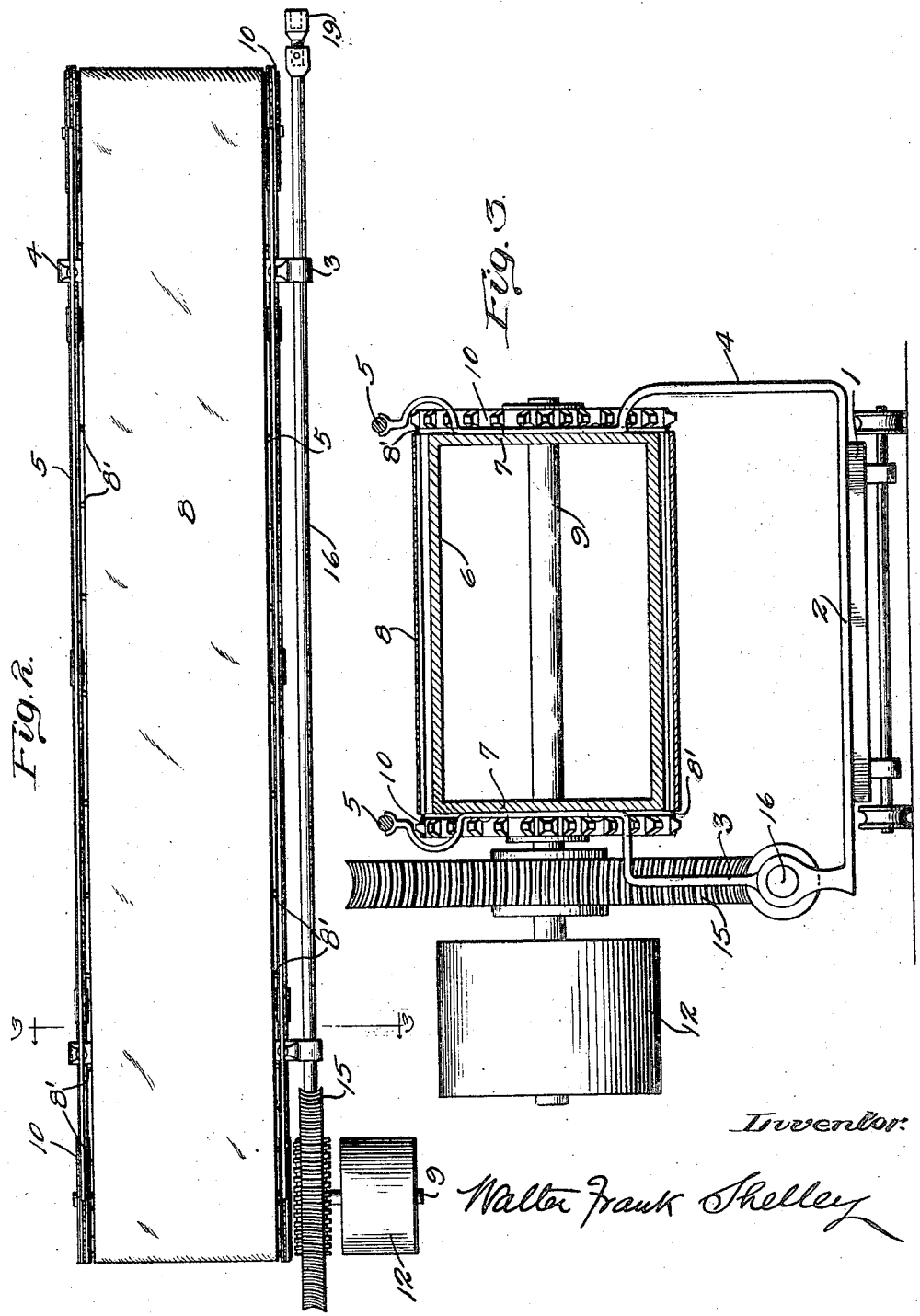

1,680,179

UNITED STATES PATENT OFFICE.

WALTER FRANK SHELLEY, OF WABUSKA, NEVADA.

LOADING MACHINE.

Application filed October 27, 1924. Serial No. 746,237.

This invention relates to conveyors, and its general object is to provide a conveyor capable of loading and unloading one or more freight cars, ships and the like with freight, baggage or other similar goods in an easy and expeditious manner with very little effort.

A further object of the invention is to provide a conveyor including a main unit and auxiliary portable units capable of association for simultaneous operation for conveying material from one to the other in succession and said auxiliary portable units being adapted to support one another while the main unit supports any one of the auxiliary units for moving the latter from place to place such as ships, cars, ware-houses, freight yards and like places.

Another object of the invention is to provide a conveyor that is simple in construction and inexpensive to manufacture, yet will function to load or unload one or more cars, ships and the like with minimum manual labor, minimum power and minimum loss of goods.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a fragmentary elevation partly in section and illustrating my conveyor in position for loading or unloading a plurality of freight cars.

Figure 2 is a top plan view of the main unit of my conveyor system.

Figure 3 is a sectional view taken on line 3—3 of Figure 2 looking in the direction of the arrows.

Referring to the drawings in detail and particularly to Figure 1, it will be noted that I have illustrated the application of my conveyor with respect to freight cars and a ware-house which is indicated by the letter A and the cars by the letters B, C, and D. While I have shown my conveyor arranged for loading or unloading freight cars, with respect to a ware-house, it will be obvious that they can likewise be used for loading or unloading ships or the like in the same manner as suggested in Figure 1.

Each of the conveyor units with the exception of the main conveyor unit is provided with a pair of wheeled platforms 1 which have secured thereto a frame including a base 2 and rising from said base are spaced parallel arms 3 and 4. The parallel arms 3 and 4 terminate at their upper ends in semi-circular recesses to accommodate rods 5 for a purpose which will be presently apparent. The main unit is provided with a wheeled platform at one end with arms rising therefrom, but the opposite end which as shown is disposed in the ware-house A is provided with spaced arms having feet to engage the floor of the ware-house as suggested in Figure 1.

The units each include a hollow elongated body 6 which has fixed thereto the parallel arms 3 and 4 and the body is provided with side walls 7 and top and bottom walls as shown. Arranged to travel longitudinally about the body 6 of each unit is an endless belt or apron 8 which is disposed so as to have its upper run arranged below the rods 5 as best shown in Figure 3 of the drawings.

Passing through the side walls of the body of each unit adjacent each end thereof is a shaft 9 having fixed to its ends sprocket wheels 10 which receive sprocket chains 11 for operating the aprons 8 through the instrumentality of strips 8' transversing the aprons and secured to the inner sides thereof at equi-distantly spaced intervals. The strips 8' have their ends fixed to the chains 11 as suggested in Figure 3 of the drawings.

Secured to one of the shafts 9 of the main unit is a pulley 12 adapted to receive a power belt 13 which is trained about the pulley of a source of power 14 as shown in Figure 1 of the drawings. Also secured to this last mentioned shaft between the pulley and its adjacent sprocket wheel is a worm wheel 15 and mounted for rotation in the arms 3 of this main unit is a shaft 16 which has secured to one end a worm arranged in mesh with the worm wheel 15 so that the power from the worm wheel will be transferred to the shaft 16. Each of the auxiliary units is also provided with a shaft disposed longitudinally thereof as shown and these shafts for distinction are indicated by the reference numerals 17 and 18. The shafts 16, 17 and 18 are arranged in alignment, and the shaft 17 is rotated from the shaft 16 and the shaft 18 from the shaft 17, and in order to accomplish this I provide universal joints 19 for connecting the shafts together.

In order to transfer motion from the shafts 17 and 18 for operating the belts of the auxiliary units, I provide a worm wheel 20 on one of the shafts 9 of each of these units and these worm wheels 20 mesh with worm gears 21 for operating the same, and the worm gears 21 are fixed to the shafts 17 and 18.

The upper run of the sprocket chains 11 are supported by small sprocket wheels 22 mounted for rotation on shafts 23 arranged in spaced parallel relation with respect to each other and secured to the body 6 of each of the units.

From the above description and disclosure of the drawings, it will be obvious that each of the auxiliary conveyors are operated from each other and that the auxiliary conveyor adjacent the main conveyor is operated therefrom, with the result that any number of conveyors can be arranged in alignment, it depending of course upon the distance that is desired to convey the material. When the conveyors are disposed and connected up for simultaneous operation, it will be apparent that due to their close association that any kind of material whether in boxed form or otherwise can be disposed upon the belts or aprons 8 at one end of the units and be conveyed to the opposite end or taken off at any place on the belts desired. The rods 5 are provided for the dual purpose, namely to retain the material on the belts while being conveyed, and they are also adapted to act as tracks to receive a conveyor through the medium of the wheels of the platforms 1 when it is desired to convey one conveyor from one place to another. It will be apparent that the wheels of the platform are grooved for this purpose. When the cars as shown have been loaded or unloaded, the last auxiliary unit may be disconnected from its adjacent conveyor and arranged upon the rods 5 thereof and returned to the ware-house. The remaining auxiliary unit is disposed upon the main unit and returned to the ware-house in the same manner, and the main unit may of course be disposed in the ware-house by merely removing the power belt 13 from its pulley 12.

It is thought from the foregoing description that the advantages and novel features of my invention will be readily apparent.

I desire it to be understood that I may make changes in the construction and in the combination and arrangement of the several parts, provided that such changes fall within the scope of the appended claims.

I claim:

1. In an apparatus of the character described, the combination of a plurality of conveyors operatively connected end-to-end to form a series, each conveyor provided with a pair of tracks in end-to-end alignment with the tracks on the preceding conveyor the last conveyor in succession adapted to be lifted onto the tracks of the preceding line of conveyors and moved thereon when no longer in use.

2. In a loading device, the combination of a main conveyor unit, a plurality of supplementary conveyor units operatively connected in series with the main unit, and means mounted on all of the conveyors whereby the last of the series of conveyors may be returned to a position at the rear of the main conveyor.

3. In a loader of the kind described, the combination of a main conveyor unit, a plurality of supplementary conveyor units operatively connected in series to said main conveyor unit, said connection permitting the series of conveyors to define a curved path for material carried by the conveyors, and means mounted on each of the conveyor units for facilitating the return of the last of the series of conveyors, in succession, to a position at the rear of the main conveyor unit.

4. In a conveyor system, the combination of a plurality of separably end-to-end series connected conveyor units, tracks mounted on each of the conveyor units, said tracks defining a path for the travel of conveyor units in either direction to lengthen or shorten the series of conveyors.

5. In a conveyor system, the combination of a series of separable conveyor units arranged end-to-end for co-operation with each other, a wheeled supporting frame for each unit, an endless belt for each unit, means on one of said units for driving the belt thereof, means on the remaining units and deriving its power from the means first mentioned for driving the belts of the remaining units, guide rods supported in parallelism above the belts upon opposite sides thereof and acting as trackways for the wheels of the supporting means for the travel of the conveyor units in either direction to lengthen or shorten the series of conveyors or to reduce the same to a single unit.

6. In an apparatus of the character described comprising conveyors, a supporting frame included in each conveyor, wheels for supporting said frames, sprockets mounted in pairs in said frames, chains trained about said sprockets, endless belts secured to said chains, a worm-gear wheel for each conveyor and being mounted for rotating said sprockets, a drive shaft for each conveyor and mounted in the frames thereof, a worm-gear on each drive shaft to mesh with its worm-gear wheel, means for driving the worm gear wheel of one of said conveyors for rotating its shaft, universal joints between the confronting ends of the drive shafts, whereby the remaining shafts are driven by the preceding shaft, guide rods secured to said frames and arranged upon opposite sides of the endless belts above the latter, and said guide rods being adapted to prevent the casual falling of material from the conveyors and also to act as track-ways for receiving the wheels of the frames as and for the purpose specified.

In witness whereof I have hereunto set my hand.

WALTER FRANK SHELLEY.